United States Patent
Harris et al.

(10) Patent No.: US 7,117,943 B2
(45) Date of Patent: Oct. 10, 2006

(54) FRICTION REDUCERS FOR FLUIDS COMPRISING CARBON DIOXIDE AND METHODS OF USING FRICTION REDUCERS IN FLUIDS COMPRISING CARBON DIOXIDE

(75) Inventors: Phillip C. Harris, Duncan, OK (US); Stanley J. Heath, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 128 days.

(21) Appl. No.: 10/758,580

(22) Filed: Jan. 15, 2004

(65) Prior Publication Data

US 2005/0155765 A1    Jul. 21, 2005

(51) Int. Cl.
*E21B 43/25*    (2006.01)
*E21B 43/267*    (2006.01)

(52) U.S. Cl. .............................. 166/280.1; 166/308.2; 166/308.3; 166/308.6; 507/202; 507/225; 507/226; 507/922

(58) Field of Classification Search ............. 166/280.1, 166/305.1, 308.2, 308.3, 308.6, 309; 507/202, 507/225, 226, 922

See application file for complete search history.

(56) References Cited

U.S. PATENT DOCUMENTS

| | | | | |
|---|---|---|---|---|
| 3,254,719 | A | * | 6/1966 | Root ....................... 166/308.2 |
| 4,532,052 | A | * | 7/1985 | Weaver et al. ............... 507/222 |
| 4,690,219 | A | * | 9/1987 | Burns et al. ................ 166/307 |
| 4,728,696 | A | * | 3/1988 | Van Phung et al. ......... 526/304 |
| 4,921,902 | A | * | 5/1990 | Evani et al. ................ 524/555 |
| 5,711,376 | A | * | 1/1998 | Sydansk .................. 166/308.6 |
| 6,011,075 | A | * | 1/2000 | Parris et al. .................. 521/64 |
| 6,607,035 | B1 | * | 8/2003 | Reddy et al. ............... 166/295 |
| 6,986,391 | B1 | * | 1/2006 | Funkhouser et al. ........ 166/300 |
| 7,004,254 | B1 | * | 2/2006 | Chatterji et al. ............ 166/279 |
| 2003/0106690 | A1 | * | 6/2003 | Boney et al. ............... 166/280 |

* cited by examiner

Primary Examiner—George Suchfield
(74) Attorney, Agent, or Firm—Robert A. Kent; Baker Botts

(57) ABSTRACT

Reduced friction fluids comprising an aqueous liquid, carbon dioxide, and a polymer comprising acrylamide and an acrylamide copolymer derivative. And methods of treating a subterranean formation comprising the steps of providing a reduced friction fluid comprising an aqueous liquid, carbon dioxide, and a polymer comprising acrylamide and an acrylamide copolymer derivative; and, introducing the reduced friction fluid to a subterranean formation.

14 Claims, 1 Drawing Sheet

FRICTION REDUCERS FOR FLUIDS COMPRISING CARBON DIOXIDE AND METHODS OF USING FRICTION REDUCERS IN FLUIDS COMPRISING CARBON DIOXIDE

BACKGROUND

The present invention relates to friction reducers and methods of using such substances. More particularly, the present invention relates to friction reducers capable of reducing the friction of fluids comprising carbon dioxide.

Viscous gelled fluids are commonly used in the hydraulic fracturing of subterranean zones to increase the production of hydrocarbons from the subterranean zones. That is, a viscous fracturing fluid is pumped through a well bore into a subterranean zone to be stimulated at a rate and pressure such that fractures are formed or enhanced into the subterranean zone. The fractures propagate, e.g., as vertical and/or horizontal cracks radially outward from the well bore.

Such viscous fluids may carry particulate material, such as proppant. When used, the particulate material is suspended in the fluid so that it is deposited in the fractures or along the gravel pack when the viscous fluid is broken and recovered. When used in a fracturing operation, the particulate material functions to prevent the fractures from closing, and thus, aids in forming conductive channels through which produced fluids may flow into the well bore. Without the particulate material, the fractures tend to close and reduce permeability gained by the fracturing operation. Suitable particulate materials must have sufficient compressive strength to resist crushing, but also must be sufficiently non-abrasive and non-angular to preclude cutting and imbedding into the formation.

In carrying out hydraulic fracturing and many other subterranean operations, fluid recovery is critical. Foamed fluids have been developed, inter alia, to provide enhanced fluid recovery through energization by the compressed gas phase. They also reduce the total amount of water used, typically by a factor of about four. Such foamed fluids have included various surfactants, known as foaming and foam stabilizing agents, for facilitating the foaming and stabilization of the foam produced when a gas is mixed with the fracturing fluid. Thus, foamed fluids are media in which a relatively large volume of gas is dispersed in a relatively small volume of liquid, usually with the aid of a surfactant that reduces the surface tension of the fluids. The most commonly used gases for foamed fracture fluids are nitrogen, carbon dioxide, and combinations of the two. Suitable gases generally are non-combustible, readily available, and relatively inexpensive. Carbon dioxide foams may be preferred based on the fact that their use results in little or no loss of hydrostatic pressure since, inter alia, carbon dioxide foam has a density close to water. Moreover, particularly in dry gas reservoirs, the higher density carbon dioxide fluid may be more effective at displacing the load water from the subterranean formation rather than the formation dry gas due to the solubility of carbon dioxide in load waters.

Foamed fluids may be preferred over conventional viscous fluids because they generally provide superior fluid recovery as well as excellent fluid loss control without forming a substantial filter cake. When used in fracturing, foamed fluids generally propagate longer and narrower fractures that remain in the producing zone and are believed to provide superior production enhancement through reduced fracture conductivity damage. Enhanced fluid recovery is provided by the expansion of the gas in the foam when the hydraulic pressure is released after the fracturing operation. This promotes flow of residual fracture fluid liquid back into the well, thus aiding in cleanup of the fracture fluid once the subterranean treatment is complete.

Fracturing techniques using foamed fluids having carbon dioxide as at least part of the gas phase are known in the art. In one common embodiment, a gelled aqueous fluid comprising a surfactant is mixed with liquid carbon dioxide at the surface of the well. The mixture, which is initially an emulsion, generally forms foam as it proceeds down the well bore to the formation to be fractured as the mixture warms to a temperature above the critical temperature of carbon dioxide (about 31° C.). Where the down hole temperature is not above the critical temperature of carbon dioxide, the mixture usually remains an emulsion. Both carbon dioxide emulsions and foams generally are suitable for use as fracturing fluids. As used herein, the term "foamed fluid" will be understood to encompass both true foams and emulsions.

In most cases, carbon dioxide foams and emulsions have deeper well capability than nitrogen foams. Carbon dioxide foamed fluids have greater density than nitrogen gas foamed fluids so that the surface pumping pressure required to reach a corresponding depth is lower with carbon dioxide than with nitrogen. Moreover, when exposed to water, carbon dioxide reacts to form carbonic acid, so that carbon dioxide foams and emulsions generally exhibit a pH in the range of from about 2 to about 6.

When fluids travel through a conduit, such as a pipeline, friction resulting from the movement of the fluid over the inside surface of the conduit may cause a pressure drop in the fluid that may increase further down from the pump. The pressure loss due to friction is commonly referred to as "friction loss" or "drag." Such friction losses result in inefficiencies that increase equipment and operations costs and may place an upper limit on the achievable pumping rate. Due to that loss in pressure, additional mechanical equipment is often necessary to keep the fluid moving at the desired rate in the conduit. However, it is not always feasible to add the additional equipment needed to overcome these losses. An alternative to additional equipment involves introducing a substance to the fluid to reduce the friction itself. Such substances, known as drag-reducers, should reduce the friction loss of the fluid being transported, should be compatible with that fluid, and should not interfere with the intended use of the fluid. Ultra-high molecular weight polymers are known to function well as drag-reducing agents in aqueous fluids. However, traditional ultra-high molecular weight polymers have been found to be ineffective drag-reducers in fluids comprising carbon dioxide.

SUMMARY OF THE INVENTION

The present invention relates to friction reducers and methods of using such substances. More particularly, the present invention relates to friction reducers capable of reducing the friction of fluids comprising carbon dioxide.

One embodiment of the present invention provides a reduced friction fluid comprising an aqueous liquid, carbon dioxide, and a polymer comprising acrylamide and an acrylamide copolymer derivative.

Another embodiment of the present invention provides a method of fracturing a subterranean formation comprising the steps of providing a reduced friction fracturing fluid comprising an aqueous liquid, carbon dioxide, and a polymer comprising acrylamide and an acrylamide copolymer derivative; and, placing the fracturing fluid into a subterranean formation at a pressure sufficient to create or extend at least one fracture therein.

Other and further features and advantages of the present invention will be readily apparent to those skilled in the art upon a reading of the description of preferred embodiments which follows.

DESCRIPTION OF PREFERRED EMBODIMENTS

Figure 1:
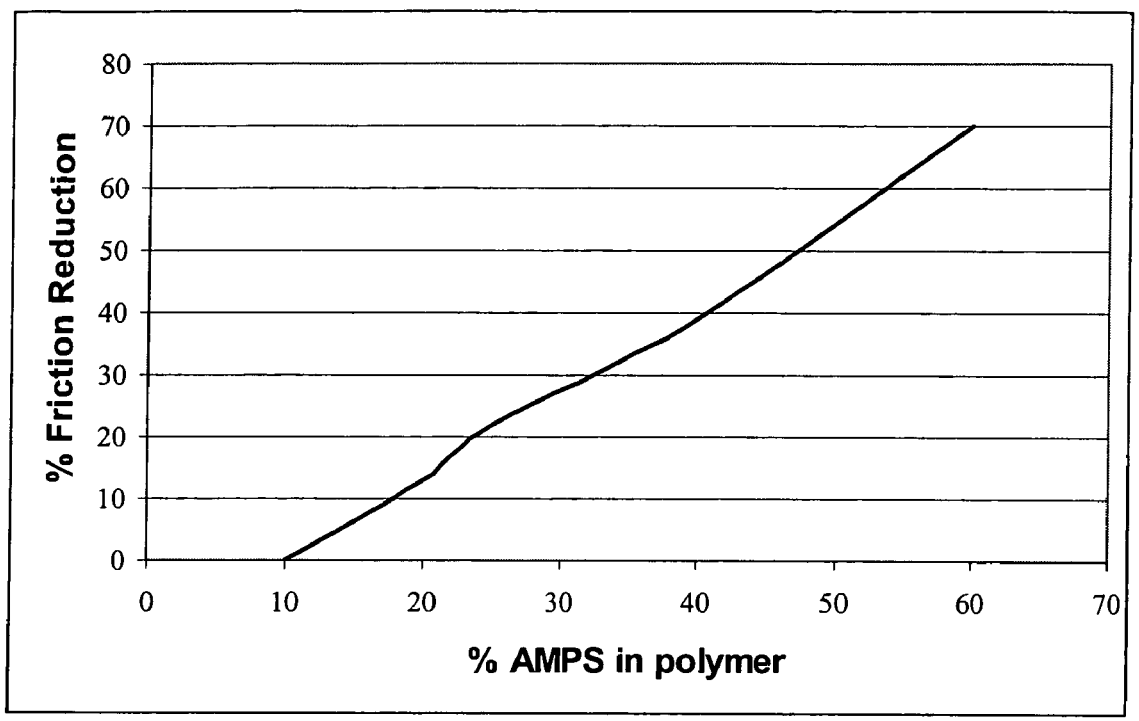
FIG. 1 is a plot of data illustrating friction reduction achieved with AMPS® in the polymer.

The present invention relates to friction reducers and methods of using such substances. More particularly, the present invention relates to friction reducers capable of reducing the friction of fluids comprising carbon dioxide.

Some embodiments of the present invention provide drag reducers comprising a polymer comprising from about 10–85% acrylamide and from about 15–90% acrylamide copolymer derivative. In other embodiments, the drag reducer of the present invention may comprise from about 20–70% acrylamide and from about 30–80% acrylamide copolymer derivative. Some embodiments of the present invention provide methods of reducing the drag of an aqueous fluid comprising carbon dioxide by adding a drag reducer comprising from about 10–85% acrylamide and from about 15–90% acrylamide copolymer derivative.

The term "acrylamide copolymer derivative," as used herein, refers to any compound comprising 2-acrylamido-2-methylpropane sulfonic acid ("AMPS®"), or acid salts thereof. AMPS is a registered trademark of The Lubrizol Corporation. Acrylamide copolymer derivatives suitable for use in the present invention must be substantially soluble in water. Examples of suitable acrylamide copolymer derivatives include AMPS, copolymers of N,N-dimethylacrylamide and 2-acrylamido-2-methylpropane sulfonic acid, and acid salts thereof. It is within the ability of one skilled in the art, with the benefit of this disclosure, to select a suitable acrylamide copolymer derivative.

The drag reducers of the present invention comprise polymers comprising acrylamide and an acrylamide copolymer derivative. As acrylamide polymers tend to hydrolyze and produce acrylic acid, the polymers of the present invention will generally further comprise at least trace amounts of acrylic acid. The acrylamide copolymer derivative component of the drag reducers of the present invention helps, inter alia, to maintain polymer in an expanded state when carbon dioxide is present. With little or no acrylamide copolymer derivative present, the polymer structure of the acrylamide tends to collapse when carbon dioxide is added, i.e., its solubility is reduced. One skilled in the art, with the benefit of this disclosure, will have knowledge of methods of creating such polymers from acrylamide copolymer derivative and acrylamide monomers.

Fluids comprising carbon dioxide suitable for use in the methods of the present invention include foams, emulsions, and gels comprising carbon dioxide. In some embodiments of the present invention, the fluid comprising carbon dioxide is a foamed carbon dioxide servicing fluid known in the art and commonly used to produce desirable long, narrow fractures into the producing zone and to minimize fluid loss. Known fluids comprising carbon dioxide used in subterranean operations generally comprise from about 10% to 90% by volume carbon dioxide in an aqueous fluid.

Some embodiments of the present invention provide methods of fracturing a subterranean formation whereby a drag reducer of the present invention is added to a carbon dioxide foamed fluid that is then placed into a subterranean formation at a pressure sufficient to create or extend at least one fracture therein. In some embodiments of the fracturing methods of the present invention, the carbon dioxide foamed fluid may further comprise proppant that acts, inter alia, to hold the fracture open while maintaining conductive channels through which such produced fluids can flow upon completion of the fracturing treatment and release of the attendant hydraulic pressure. One skilled in the art will recognize that the fracturing methods described above may also be used in "frac packing" operations wherein the fracture operation is allowed to screenout and form a gravel pack in addition to a proppant-filled fracture.

Any particulate material suitable for use in conjunction with subterranean applications is suitable for use as proppant in the compositions and methods of the present invention. Natural sand, quartz sand, particulate garnet, glass, ground walnut hulls, nylon pellets, bauxite, ceramics, polymeric materials, or the like are all suitable. Suitable sizes range from 4 to 100 U.S. mesh, in certain preferred embodiments the sizes range from 10 to 70 U.S. mesh.

To facilitate a better understanding of the present invention, the following examples of preferred embodiments are given. In no way should the following examples be read to limit or define the scope of the invention.

EXAMPLES

A base fluid for flow drag tests was prepared with 1.0 gal/Mgal of various friction reducers, hydrated in tap water containing 2.7% $KNO_3$. The base friction reducer fluid was put into the high pressure flow loop (stainless steel, with 0.305 inch I.D. tubing), pressurized to 1000 psi, and circulated at 1000 $sec^{-1}$ stepped down to 100 $sec^{-1}$. Carbon dioxide was added up to 20%, with liquid effluent from the backpressure regulator weighed on an electronic balance. Once a stable fluid was equilibrated in the flow loop, 2 gal/Mgal cocoamidopropyl betaine was injected from a pump over two passes of the fluid. The fluid with each friction reducer, 20% carbon dioxide, and cocoamidopropyl betaine was measured while circulating at 1000 $sec^{-1}$ stepped down to 100 $sec^{-1}$.

The friction reducers tested were:

Sample 1: polymer comprising acrylamide, and trace acrylate;

Sample 2: polymer comprising 15–20% AMPS, acrylamide, and trace acrylate;

Sample 3: polymer comprising cationic acrylamide;

Sample 4: polymer comprising acrylamide, and acrylate;

Sample 5: polymer comprising 60% AMPS, 39.5% acrylamide, and 0.5% acrylate;

Sample 6: polymer comprising less than 10% AMPS, acrylamide, and trace acrylate;

Sample 7: polymer comprising cationic acrylamide;

Sample 8: polymer comprising 20–25% AMPS, acrylamide, and acrylate; and,

Sample 9: polymer comprising 40% AMPS, acrylamide, and trace acrylate.

TABLE 1

Friction Reducing Capability of the Above Samples:

| Sample Number | % AMPS | % Friction Reduction in the base fluid foamed with 20% by volume $CO_2$ |
|---|---|---|
| 1 | 0 | 0 |
| 2 | 15–20 | 13 |
| 3 | 0 | 0 |
| 4 | 0 | 0 |
| 5 | 60 | 70 |
| 6 | <10 | 0 |
| 7 | 0 | 0 |
| 8 | 20–25 | 22 |
| 9 | 40 | 39 |

The data as shown in Table 1 and plotted in FIG. 1, clearly show that the inclusion of AMPS in the polymer has the ability to greatly improve the performance of an acrylamide polymer as a drag reducer in a fluid comprising carbon dioxide.

Therefore, the present invention is well adapted to carry out the objects and attain the ends and advantages mentioned as well as those that are inherent therein. While numerous changes may be made by those skilled in the art, such changes are encompassed within the spirit and scope of this invention as defined by the appended claims.

What is claimed is:

1. A method of treating a subterranean formation comprising the steps of:
   providing a reduced friction fluid comprising an aqueous liquid, carbon dioxide, and a polymer consisting essentially of acrylamide and an acrylamide copolymer derivative;
   introducing the reduced friction fluid to a subterranean formation through a well bore; and,
   reducing the friction of the reduced friction fluid due to the step of placing the reduced friction fluid into the subterranean formation through the well bore.

2. The method of claim 1 wherein the polymer consists essentially of from about 10–85% acrylamide and from about 15–90% of an acrylamide copolymer derivative.

3. The method of claim 1 wherein the polymer consists essentially of from about 20–60% acrylamide and from about 40–80% of an acrylamide copolymer derivative.

4. The method of claim 1 wherein the reduced friction fluid further comprises particulates.

5. The method of claim 1 wherein the acrylamide copolymer derivative is selected from the group consisting of:
   2-acrylamido-2-methylpropane sulfonic acid;
   a copolymer of N,N-dimethylacrylamide and 2-acrylamido-2-methylpropane sulfonic acid; and
   acid salts thereof.

6. The method of claim 1 wherein the reduced friction fluid is a foam, an emulsion, or a gel.

7. The method of claim 1 wherein the step of reducing the friction uses at least the polymer consisting essentially of the acrylamide and the acrylamide copolymer derivative.

8. A method of fracturing a subterranean formation comprising the steps of:
   providing a reduced friction fracturing fluid comprising an aqueous liquid, carbon dioxide, and a polymer consisting essentially of acrylamide and an acrylamide copolymer derivative;
   placing the reduced friction fracturing fluid into a subterranean formation through a well bore at a pressure sufficient to create or extend at least one fracture therein; and,
   reducing the friction of the reduced friction fracturing fluid due to the step of placing the reduced friction fracturing fluid into the subterranean formation through the well bore.

9. The method of claim 8 wherein the polymer consists essentially of from about 10–85% acrylamide and from about 15–90% of an acrylamide copolymer derivative.

10. The method of claim 8 wherein the polymer consists essentially of from about 20–60% acrylamide and from about 40–80% of an acrylamide copolymer derivative.

11. The method of claim 8 wherein the reduced friction fracturing fluid further comprises proppant.

12. The method of claim 8 wherein the acrylamide copolymer derivative is selected from the group consisting of: 2-acrylamido-2-methylpropane sulfonic acid;
   a copolymer of N,N-dimethylacrylamide and 2-acrylamido-2-methylpropane sulfonic acid; and
   acid salts thereof.

13. The method of claim 8 wherein the reduced friction fracturing fluid is a foam, an emulsion, or a gel.

14. The method of claim 8 wherein the step of reducing the friction uses at least the polymer comprising the acrylamide and the acrylamide copolymer derivative.

* * * * *